United States Patent Office.

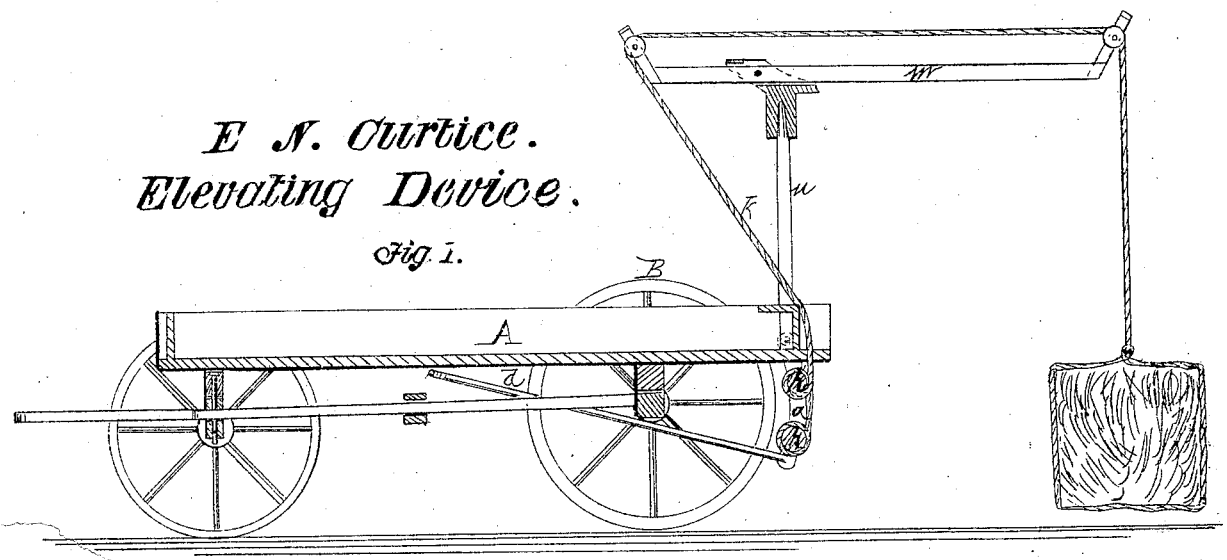
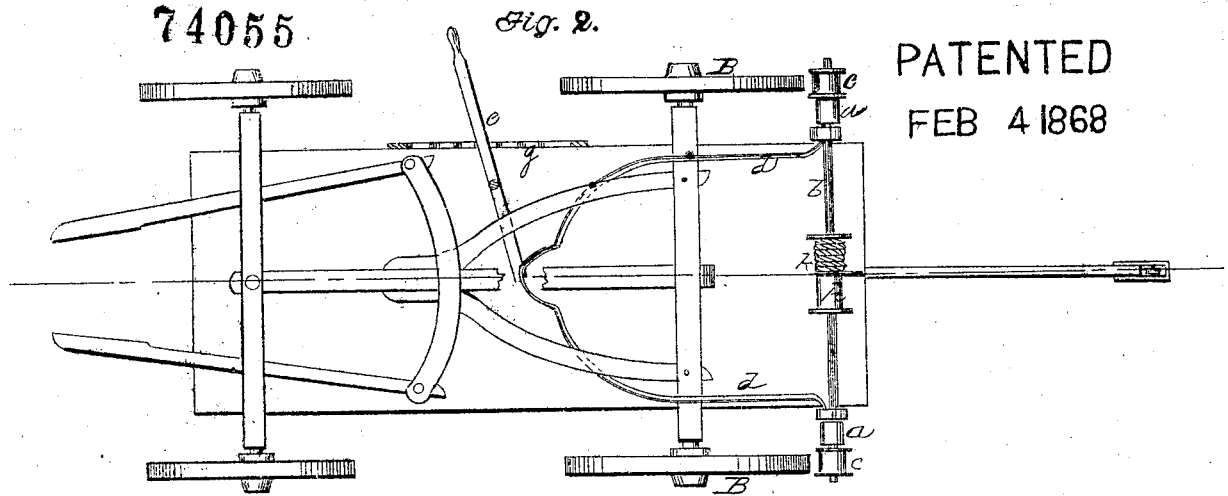
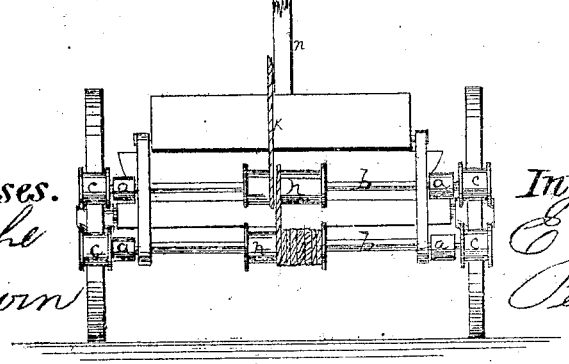

EZRA N. CURTICE, OF SPRING WATER, NEW YORK.

Letters Patent No. 74,055, dated February 4, 1868.

IMPROVEMENT IN HAY-LOADERS.

*The Schedule referred to in these Letters Patent and making part of the same.*

TO ALL WHOM IT MAY CONCERN:

Be it known that I, EZRA N. CURTICE, of Spring Water, in the county of Livingston, and State of New York, have invented a new and useful Improvement in Elevating-Device for Loading Hay, &c.; and I do hereby declare that the following is a full, clear, and exact description thereof, which will enable others skilled in the art to make and use the same, reference being had to the accompanying drawings forming part of this specification.

Figure 1 is a sectional side elevation of a wagon, with my improved elevating-device attached.

Figure 2 is a top view of the same.

Figure 3 is a front view of the same.

Similar letters of reference indicate corresponding parts.

This invention relates to a new and useful device for working hay-loaders, elevators, &c., and consists in applying rubber friction-rollers to the hind wheels in such manner that they shall rotate one or more drums placed on the shafts of the friction-rollers, and wind a rope for elevating hay, &c., as may be required.

A is a wagon-body, mounted on wheels B B, and on the hind part of the box are attached oscillating brackets or arms, $a$ $a$, on each side, which serve as bearings for shafts $b$ $b$, on the ends of which are hung rubber friction-rolls, $c$ $c$, in the rear of the wheels B B. The arms $a$ $a$ are connected by rods, $d$ $d$, with a lever, $e$, placed on one side of the wagon, which lever works the friction-rolls to bear them against the wagon-wheels, in order to give them motion, and the lever $e$ is held in place by a ratchet, $g$. On the shafts $b$ $b$ are fastened drums $h$ $h$, to which is attached a rope, $k$, that passes through sheaves over the gib, $m$, of a crane-post, $n$, set in the wagon, and when the friction-rolls are rotated by the wheels the rope is wound upon one of the drums to raise a bunch of hay, as shown in fig. 1, to load it in the wagon, or for any similar purpose of elevating.

The friction-rollers are provided with flanges, to keep them in place on the wheels, and one or two sets may be employed, as more or less power is required. One or more sets of rollers can also be applied to the front side of the hind wheels, the rope running round from one to the other, if more power is required.

Having thus described my invention, what I claim as new, and desire to secure by Letters Patent, is—

The construction and arrangement of the shafts $b$ $b$, having drums $h$, and hung to the pivoted pendant $a$, and provided with the flanged elastic friction-rollers $c$ $c$, operating against the hind wagon-wheels B, by means of the curved rods $d$ and lever $e$, as herein described for the purpose specified.

EZRA N. CURTICE.

Witnesses:
 CHAS. SCHWAB,
 G. F. SCHWAB.